United States Patent
Kamiya et al.

[11] Patent Number: 5,549,874
[45] Date of Patent: Aug. 27, 1996

[54] DISCHARGE REACTOR

[75] Inventors: Ichiro Kamiya, Tokyo; Ryoichi Shinjo, Kanagawa-ken; Takeshi Murakami, Kanagawa-ken; Yukiko Nishioka, Kanagawa-ken; Minoru Harada, Kanagawa-ken, all of Japan

[73] Assignee: EBARA Corporation, Tokyo, Japan

[21] Appl. No.: 49,866

[22] Filed: Apr. 20, 1993

[30]     Foreign Application Priority Data

Apr. 23, 1992  [JP]  Japan .................................. 4-130168
Apr. 23, 1992  [JP]  Japan .................................. 4-130171

[51] Int. Cl.$^6$ ...................................... B01J 19/08
[52] U.S. Cl. ........................ 422/186.04; 422/186.07; 422/907
[58] Field of Search ................ 422/186, 186.04, 422/186.05, 907, 186.07

[56]     References Cited

U.S. PATENT DOCUMENTS

| | | | |
|---|---|---|---|
| 4,945,290 | 7/1990 | Eliasson et al. | 315/246 |
| 4,970,056 | 11/1990 | Wooten et al. | 422/186.07 |
| 5,200,670 | 4/1993 | Scott | 315/111.91 |
| 5,296,122 | 3/1994 | Katsube et al. | 204/298.04 |
| 5,346,578 | 9/1994 | Benzing et al. | 156/345 |

FOREIGN PATENT DOCUMENTS

| | | |
|---|---|---|
| 0223411 | 5/1987 | European Pat. Off. . |
| 61-215202 | 9/1986 | Japan . |
| 63-25203 | 2/1988 | Japan . |
| 63-242903 | 10/1988 | Japan . |
| 1-298003 | 12/1989 | Japan . |
| 2-172802 | 7/1990 | Japan . |
| 2-245236 | 10/1990 | Japan . |

OTHER PUBLICATIONS

"Kagaku Binran (Chemical Handbook)—Ohyohen (Application)", pp. 1155–1157, compiled by the Chemical Society of Japan; and an English translation of excerpts.
Chinese National Standard No. 13016–T2047, Entitled *Ozonizer (Small–Sized Silent Discharge Type)* with translation thereof.
European Search Report for EP–93106543, dated Aug. 8, 1994.
EPO Database Publication AN 90–339271 & JP–A–2 245236.

*Primary Examiner*—Donald P. Walsh
*Assistant Examiner*—Daniel Jenkins
*Attorney, Agent, or Firm*—Armstrong, Westerman, Hattori, McLeland & Naughton

[57]     ABSTRACT

A discharge reactor that generates silent discharge and/or creeping discharge between dielectric and high voltage electrode and/or grounded electrode, said dielectric being located between high voltage electrode and grounded electrode, and which generates clean ozone in the discharge space 1 as it passes through said discharge space 1 or as it is held within said discharge space 1, which discharge reactor is characterized in that the dielectric is made of highly purified quartz glass ($SiO_2$) or single-crystal sapphire which is a highly purified crystallized aluminium oxide or high-purity alumina ceramics which is the firing of highly purified aluminum oxide. Further, in order to obtain cleaner and highly concentration ozone, at least the electrode or electrodes in the area of the discharge space which is to be exposed to discharge are made of a high-purity aluminum material and at least the area of the discharge space which is to be exposed to discharge is further coated with an anodic oxidation film.

5 Claims, 2 Drawing Sheets

DISCHARGE REACTOR

BACKGROUND OF THE INVENTION

1. Field of the Invention

The present invention relates to a discharge reactor for producing silent discharge and/or creeping discharge so that a substance will undergo reaction in the discharge space.

2. Description of Prior Art

Discharge reactors of the type contemplated by the present invention are typically used as an ozonizer and an ionizer, most commonly as an ozonizer. An ozonizer and other apparatus in which a dielectric is provided between a high voltage electrode and a grounded electrode and silent discharge or creeping discharge is caused to occur between the dielectric and the high voltage electrode and/or grounded electrode are available in various models and constructions as described below.

FIGS. 1–5 show diagrammatically the constructions of five typical discharge reactors that have heretofore been proposed or commercialized. In FIGS. 1–5, the reference numeral 2 denotes a dielectric, 3 is a high voltage electrode and 4 is a grounded electrode. Shown by 5 in FIGS. 1, 2, 4 and 5 is an insulator that insulates electrically the high voltage electrode 3 and the grounded electrode 4 with the dielectric 2 being interposed. The insulator 5 also works as a sealant to isolate the discharging area from the ambient atmosphere to form a discharge space 1. Shown by 6 in FIG. 3 is an insulating/sealing wall that established electric insulation from the ambient atmosphere to form the discharge space 1. Shown by 7 in FIGS. 1–5 is a high voltage ac power supply that is connected to the high voltage electrode 3 and the grounded electrode 4 and which applies high ac voltage to produce discharge in the space 1.

FIG. 1 shows a discharge reactor in which two dielectrics 2 are provided on the surfaces of the electrodes 3 and 4 for causing silent discharge to occur between the dielectrics 2 in the discharge space 1. In the apparatus shown in FIG. 1, neither the high voltage electrode 3 nor the grounded electrode 4 is exposed in the discharge space 1.

The discharge reactor shown in FIG. 2 has basically the same construction as the apparatus shown in FIG. 1 except that dielectric 2 is provided only on the surface of grounded electrode 4 and that high voltage electrode 3 has its surface exposed in the discharge space 1. In the apparatus shown in FIG. 2, silent discharge is generated in the gap between high voltage electrode 3 and dielectric 2.

The discharge reactor shown in FIG. 4 has basically the same construction as the apparatus shown in FIG. 2 except that dielectric 2 is provided only on the surface of high voltage electrode 3 and that ridges 4-1 are provided on grounded electrode 4 in order to ensure that a high density discharge is produced at a comparatively low voltage. The minimum uniform gap G between the surface of the dielectric 2 and the tops of ridges 4-1 on the grounded electrode 4 is usually not wider than 0.5 mm. Silent discharge will occur predominantly in the apparatus shown in FIG. 4 but since creeping discharge occurs at the tops of ridges 4-1, a combination of two types of discharge, so called silent and creeping discharges, occur in the apparatus.

In the discharge reactor shown in FIG. 5, dielectric 2 is provided between high voltage electrode 3 and grounded electrode 4 and discharge space 1 is provided not only between the high voltage electrode 3 and dielectric 2 but also between the dielectric 2 and the grounded electrode 4. Silent discharge occurs in each of the two discharge spaces 1.

In the discharge reactor shown in FIG. 3, dielectric 2 is provided on surface of the grounded electrode 4 whereas a high voltage electrode 3 smaller than the grounded electrode 4 and dielectric 2 is provided on top of the dielectric 2, with discharge space 1 being provided above the high voltage electrode 3. Creeping discharge occurs in the space 1 between high voltage electrode 3 and dielectric 2. The apparatus may be modified by interchanging the positions of high voltage electrode 3 and grounded electrode 4.

The discharge reactors shown in FIGS. 1–5 are basically of a flat plate type but they may be of a cylindrical type or the positions of the grounded electrode and the high voltage electrode may be interchanged. In addition, various modifications may be made to the geometry of electrodes, their layout, etc.

If, given a discharge reactor of the same type and dimensions (with a constant area of discharge), one wants to improve its performance, say, the yield and concentration of ozone, it is necessary to generate a high-density silent discharge or creeping discharge (the two types of discharge are hereunder collectively referred to as "ozonizer discharge") by increasing the power for discharge (power input per unit area of discharge). While various electrical factors are involved, the capacitance contributed to discharge of the apparatus at issue is particularly important and for the purpose of generating a ozonizer discharge of high density, the higher the capacitance C of the dielectric used, the better.

The capacitance C of a dielectric per unit area is expressed by the following equation:

$$C = \epsilon/t$$

where $\epsilon$ is the dielectric constant of the dielectric and t is the thickness of the dielectric.

As one can see from the equation, the dielectric constant of the dielectric must be increased or the thickness t of the dielectric must be reduced in order to increase its capacitance C. The dielectric constant $\epsilon$ is inherent in a given dielectric material and ceramics commonly used today show $\epsilon$ values of at least 9 and there are very few practical substances that excel them. Therefore, the current method used to increase the power for discharge is reducing the thickness t of the dielectric but, then, the withstand voltage or the strength of the dielectric will decrease, or difficulty is encountered in the manufacturing process or a further reduction in thickness will occur on account of a sputtering effect due to discharge; all of these factors contribute to a shorter service life of the dielectric. For practical purposes, a thickness of 0.1–1 mm will suffice but in general, a minimum thickness of 0.5 mm is necessary.

In the discharge reactor shown in FIG. 1, two dielectrics 2 are provided on the surfaces of the two electrodes, making the thickness t twice as large. Hence, the capacitance of the dielectric 2 is halved and this is disadvantageous for the purpose of increasing the power for discharge. As a result, it is not easy to generate the ozonizer discharge of high density necessary for increasing the concentration and yield of ozone. However, even this arrangement can be used to fabricate a commercial discharge reactor if the reactants are extremely corrosive and, hence, are hazardous to metallic electrodes.

Further, discharge reactors having the constructions shown in FIGS. 1–5 have heretofore used glass as the material of dielectric 2 in order to meet the requirements for good electrical insulation and high withstand voltage, as well as the ability to withstand the erosive action of a reaction product such as ozone. Today, ceramics having comparatively high dielectric constants are used in reactors with a view to improving ozone generation and increasing the concentration of the product ozone.

As mentioned above, the ceramics used as the material of dielectric 2 are selected from among those of comparatively high dielectric constants which have good electrical insulation, high withstand voltage and high corrosion resistance. Such ceramics are typically used as independent fired plates or, alternatively, they are baked or plasma sprayed onto the high voltage electrode 3 or grounded electrode 4. In whichever case, the formation of materials defects such as vacancies (e.g., pinholes) and voids in the bulk or surface of the dielectric 2 is unavoidable. Furthermore, the presence of impurities or gaseous components in the raw materials of ceramics and their ingredients is unavoidable, as is the introduction of such impurities or gaseous components during the mixing, shaping and firing steps. As a result, the dielectric 2 contains significant amounts of impurities.

Even if the pinholes in the dielectric 2 are small (<tens µm) under ozonizer discharge, abnormal discharge or void discharge (i.e., a discharge that develops in small cavities in a dielectric) will occur in the neighborhood of those small pinholes, leading to deterioration or failure of the dielectric 2. In addition, highly concentrated ozone has great oxidizing power and, hence, erosive action; furthermore, the high density discharge that has become possible as a result of improvement in the performance in ozone generation accelerates the sputtering effect, whereby the surface of the ceramic material (dielectric 2) is scraped and deleterious void discharge is accelerated.

As a consequence, the life of the dielectric 2 is shortened and the performance in ozone generation is lowered. Furthermore, the eroded or scraped dielectric 2 will release deleterious ingredients, impurities, harmful gases, etc. from the ceramic material, thereby contaminating the reaction product (ozone gas). To avoid this problem, one of the following treatments has been applied to the surface of the dielectric 2 (ceramic material):

(1) applying a highly flowable, insulating glaze onto the surface of the dielectric 2 and glazing it so that materials defects through the surface are covered to enhance the strength of the dielectric, thereby controlling the occurrence of abnormal discharge;

(2) forming an extremely thin film of high-purity alumina ($Al_2O_3$) or quartz ($SiO_2$) having high resistance to sputtering by a suitable technique such as CVD, sputtering or ion plating.

The first approach enables the formation of a thick coating and, hence, is very effective for the purpose of correcting materials defects and controlling the occurrence of abnormal discharge. On the other hand, the presence of impurities in the applied coating after firing is unavoidable and they will contribute to surface toughening on account of the sputtering effect caused by discharge; therefore, in the case where the reaction product (e.g., ozone) is required to be highly pure, such impurities will be released from the coating to contaminate the reaction product.

To form a high-purity and damage free film by the second approach, the film thickness must not exceed a few microns. However, the film will, in any case shed off or be otherwise damaged in less than 200 hours, thus totally failing to serve the purpose. Furthermore, the heretofore employed techniques such as CVD, sputtering and ion plating are complicated and time consuming and consequently expensive.

With recent improvements in the performance of ozonizers, the use of ozone in during semiconductor fabrication is increasing and there is a growing demand for the development of an ozonizer that has a long service life, that is highly reliable and that is capable of producing an ozone gas which is highly concentrated and free of impurities.

The discharge reactors of the types shown in FIGS. 2–5 use only one dielectric 2 and, hence, they are advantageous from the viewpoint of the capacitance of dielectric 2. However, as can be seen from FIGS. 2–5, those reactors have either one or both of the electrodes exposed in the discharge space 1 and a discharge is generated between the surface of the exposed electrode (which may be either the high voltage electrode 3 or the grounded electrode 4 or both) and the dielectric 2. Under the circumstances, the electrode material must be such that it can withstand the erosive action of ozonizer discharge and ozone; if the density of discharge is comparatively low, an austenitic stainless steel is commonly used as the electrode material and if the density of discharge is high, tungsten or titanium is often used as the electrode material.

Japanese Patent Public Disclosure (Laid-Open) No. 245,236/1990 filed by the same assign as that of the subject application discloses, as an electrode material(s), Al (purity: 98.S wt % or less) or Al-alloy having at least the area of the discharge space which is to be exposed for discharging is further coated with an anodic oxidation film. Alternatively, it discloses as an electrode material(s) Ti or Ti-alloy having at least the area of the discharge space which is to be exposed for discharging is further coated with an anodic oxidation film or a hot anodic oxidation film. When the procedure of Example in this application was followed using alumina ceramics (purity: 96 wt %) as a dielectric material, ozone was generated in a concentration of about 4–5 vol % with alkali metals, alkaline-earth metals and heavy metals being present in several hundred ppt.

Further, as a material used for a high voltage electrode and/or a grounded electrode which is adhered to the surface of a dielectric without coming into contact with the discharge zone, a film of Ag, Ag-Pd alloy, Au, or Mo-Mn alloy has been conventionally used in a discharge reactor.

With reference to FIGS. 2–5, the surface of either high voltage electrode 3 or the grounded electrode 4 or both are exposed to a mixed field of concentrated ozone which has great oxidative power and high-density ion or plasma and, hence, the electrodes will be consumed, causing the electrode material to enter the reaction product (ozone gas), typically as an oxide, whereby not only is the reaction product contaminated but also the electrode material is redeposited on the electrode or deposited on the dielectric 2, leading to deterioration in performance as a result of the synergistic effect in combination with the electrode consumption. Furthermore, the electrode material in oxide form will contaminate the inner surface of the discharge space 1. This phenomenon tends to become worse as the density of discharge increases. Depending on the electrode material, substances that are deleterious to the user of ozone gas may be released as sources of contamination.

With the recent improvement in the performance of ozonizers, their application to the process of semiconductor fabrication is increasing and there is a growing demand for the development of an ozonizer that is capable of producing "clean" ozone gas which is highly concentrated and substantially free of impurities. The process of semiconductor fabrication particularly hates contamination by alkali metals, alkaline-earth metals and heavy metals; however, the dielectric materials and the electrode materials to be used in ozonizers contain relatively large amounts of alkali metals and alkaline-earth metals such as Na, K, and Mg, and heavy metals such as Fe, Cu, Cr and Ni and, therefore, the consumption of the dielectric and the electrodes will result in the contamination of the ozone gas generated, making it totally unfit for use. Al impurity will not result in any great adverse effect in the process of semiconductor fabrication compared to the alkali metals, the alkaline-earth metals and the heavy metals. However, amounts of Al in an ozone gas generated is analyzed in view of checking erosion of Al-base dielectrics and electrodes.

SUMMARY OF THE INVENTION

It is an object of the invention to provide a discharge reactor that exhibits consistent performance over a prolonged time and which is capable of yielding clean ozone, said ozone being below the detection limits on ppb order for Na, K, Mg, Fe, Cu, Cr and Ni.

It is another object of this invention provide a discharge reactor that exhibits consistent performance over a prolonged time and which is capable of yielding cleaner ozone, said ozone being below the detection limit on ppt order for Na, K, Mg, Fe, Cu, Cr and Ni which are required for a process of producing semiconductors of 64 M Bits or higher levels of integration such as 256 M Bits.

Other objects and advantages of the present invention will become apparent to those skilled in the art from the following description and drawings.

DETAILED DESCRIPTION OF THE PREFERRED EMBODIMENTS

Figure 1:
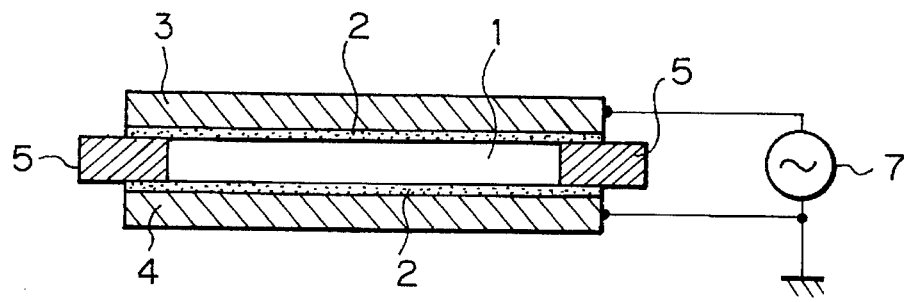
FIG. 1 is a diagram showing schematically the construction of a discharge reactor.

The aforementioned first object of the present invention can be attained by a discharge reactor that generates silent discharge and/or creeping discharge between a dielectric and a high voltage electrode and/or a grounded electrode, a dielectric being located between said high voltage electrode and said grounded electrode, and which causes a substance to undergo reaction in the discharge space as it passes through said discharge space or as it is held within said discharge space, which reactor is characterized in that the dielectric is formed of quartz glass ($SiO_2$) purified to 99.99 wt % or more.

The object of interest can also be attained by a discharge reactor that generates silent discharge and/or creeping discharge between a dielectric and a high voltage electrode and/or a grounded electrode, said dielectric being located between said high voltage electrode and said grounded electrode, and which causes a substance to undergo reaction in the discharge space as it passes through said discharge space or as it is held within said discharge space, which reactor is characterized in that the dielectric is formed of crystal sapphire which is a highly purified crystallized aluminium oxide.

The same object can also be attained by a discharge reactor that generates silent discharge and/or creeping discharge between a dielectric and a high voltage electrode and/or a grounded electrode, said dielectric being located between said high voltage electrode and said grounded electrode, and which causes a substance to undergo reaction in the discharge space as it passes through said discharge space or as it is held within said discharge space, which reactor is characterized in that the dielectric is formed of a high-purity alumina ceramic material that is the firing of aluminum oxide purified to 99.7 wt% or more.

In accordance with the present invention, high-purity quartz glass (SiOn) or crystal sapphire or the firing of high-purity alumina ceramic material that are substantially free from impurities or which contain the lowest possible levels of impurities are used as the material of the dielectric to be used in the discharge reactor; hence, as will be described below in detail, reaction products such as ozone can be yielded in high concentrations and in a consistent manner with little or substantially free of impurities present that can cause deleterious effects on the process of semiconductor fabrication.

Aluminum has generally high resistance to the corrosive action of ozone and which has satisfactory characteristics for use as an electrode material (i.e., high electric conductivity and thermal conductivity, plus ease in working). Further, in order to attain the another object of the present invention, the discharge reactor also uses highly purified aluminum and, furthermore, the electrode surface is coated with an anodic oxidation film that is kept at sufficiently high purity to provide a hardness and film thickness capable of withstanding subsequent discharge, thereby minimizing the possible consumption of the electrode.

Further, dielectric materials are selected such that they satisfy the necessary conditions for use as dielectrics and that they have high resistance to the corrosive action of ozone, contain no defects and are resistant to the sputtering effect. Dielectrics that are formed of these materials will permit impurities to enter in only very limited quantities irrespective of whether they are in bulk form or in the process of dielectrics production; even if the principal components of those materials should get into the reaction product, no harm will be done to the process of semiconductor fabrication which uses the reaction product.

A discharge reactor generates silent discharge and/or creeping discharge between a dielectric and a high voltage electrode and/or a grounded electrode, said dielectric being located between said high voltage electrode and said grounded electrode, and which causes a substance to undergo reaction in the discharge space as it passes through said discharge space or as it is held within said discharge space which reactor is characterized in that at least the electrode or electrodes in the area of said discharge space which is to be exposed to discharge are made of a high-purity aluminum material purified to 99.5 wt % or more and at least the area of said discharge space which is to be exposed to discharge is further coated with an anodic oxidation film.

In a preferred embodiment, an electrolytic solution for anodic oxidation that is substantially free from impurities or which is controlled to contain a minimum of impurities is used so that an anodic oxidation film is formed on the electrode material with care being taken to minimize the entrance of impurities in the anodic oxidation step.

EXAMPLES

The following examples are given to further illustrate this invention, but it should be understood that the invention is by no means limited thereto. On the contrary, they are given only to clarify some of the essential embodiments of the present invention.

Example 1

Dielectric 2 was made of high-purity quartz glass (SiO$_2$) in a thickness of 0.65 mm that was prepared by melting silicic anhydride of high purity at elevated temperature. The quartz glass had a purity of at least 99.99 wt % and it was characterized by extremely low contents of alkali metals, alkaline-earth metals and heavy metals which are deleterious to the process of semiconductor fabrication. Two grades of such quartz glass were used in Example 1 and the data for analysis of the impurities contained are given below.

Grade 1
Al: 8.00 ppm
Fe: 0.40 ppm
Na: 0.80 ppm
K: 0.80 ppm
Grade 2
Al: 0.10 ppm
Fe: 0.05 ppm
Na: 0.05 ppm
K: 0.05 ppm Quartz glass of grade 2 had ultra-high purity. Using either grade of quartz glass as the material of dielectric 2, discharge reactors having the construction shown in FIG. 4 were fabricated, with the grounded electrode 4 being formed of aluminum (A5052p Japanese Industrial Standard, purity: 95.75–96.55 wt %) that was anodic oxidized on the surface within the discharge zone, and with the high voltage electrode made of metallized Ag film in a thickness of about 10 μm being adhered to on the surface of the dielectric without coming into contact with the discharge zone. High-density (about 10 kW/m$^2$) ozonizer discharge was generated between the dielectric 2 and grounded electrode 4 as starting oxygen was supplied into the discharge space 1. As a result, ozone was generated consistently in concentrations of at least 10 vol % irrespective of whether quartz glass of grade 1 or 2 was used. The ozone gas generated was subjected to atomic-absorption spectrometry for elemental analysis, chiefly for alkali metals and alkaline-earth metals (such as Na, K and Mg), heavy metals (such as Fe, Cu, Cr and Ni) and aluminum. Except for Al, the contents of all elements of interest were below the detection limits on the ppt order. Aluminum analysis was conducted in order to check for any effect of the material of grounded electrode 4.

Aluminum was detected in an amount on the order of tens ppt and this would be due primarily to the release of aluminum from the grounded electrode 4. After continuous operation for several hundred hours, the discharge space 1 was made open to examine the surface of the dielectric 2; small indentations were found on the surface of the dielectric 2 in positions that faced the tops of ridges 4-1 on the grounded electrode 4 but they were insignificant since they were not reflected in the measurement with a surface roughness meter. These indentations may have been formed by discharge since the quartz glass had a comparatively low hardness (6 on the Mohs scale). No stain was found on the exposed surfaces in the discharge space 1.

During the operation of the reactor, the waveform of discharge was examined but there was found nothing abnormal; after prolonged continuous operation for several hundred hours, the discharge space 1 was made open and its interior was checked but there was no indication of abnormal discharge. This was because the dielectric 2 was formed of quartz glass in amorphous state, which was free from vacancies that would become sites for the formation of pinholes, nor were there any defects. One can readily anticipate that generally the same results will be obtained with discharge reactors of other constructions, namely, those shown in FIGS. 1, 2, 3 and 5.

Example 2

The procedure of Example 1 was repeated except that the positions of the grounded electrode and the high voltage electrode were interchanged. The purity and concentration of the ozone gas generated were substantially the same as in Example 1.

Example 3

Dielectric 2 was made of high-purity single-crystal sapphire having a thickness of 0.65 mm. The sapphire had an ultrahigh purity of at least 99.999 wt %. In Example 3, the high-purity single-crystal sapphire was used in place of the quartz glass used in Example 1 and this is because the dielectric constant ε of the single-crystal sapphire was at least 9, more than double the value for quartz glass (about 3.6) and because the single-crystal sapphire enables ozonizer discharge to be generated in high density, which contributes to improved performance in ozone generation, more than double the case of using quartz glass. At the same time, the single-crystal sapphire is very hard (9 on the Mohs scale, which is almost comparable to the value 10 for diamond) and is capable of withstanding high-density discharge, thus insuring prolonged service life.

Figure 3:
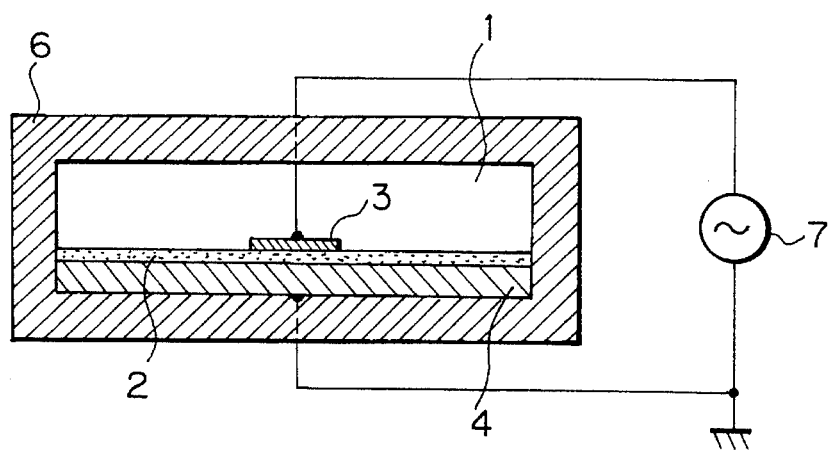
FIG. 3 is a diagram showing schematically the construction of yet another discharge reactor.
Figure 4:
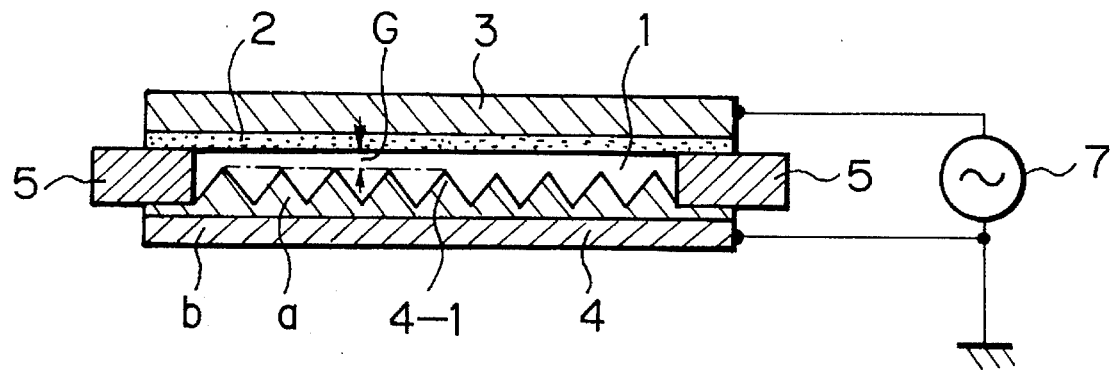
FIG. 4 is a diagram showing schematically the construction of still another discharge reactor.

Example 1 was repeated except for using the ultrahighpurity single-crystal sapphire as the material of dielectric 2, high-density (about 15–20 kW/m$^2$) discharge was generated in a discharge reactor having the construction shown in FIG. 4. As a result, ozone was generated consistently in concentrations of at least 10 vol % in quantities 2 –2.5 times the amount generated in Example 1. The ozone gas generated was subjected to atomic-absorption spectrometry for analysis of the same elements as in Example 1 (i.e., Na, K, MK, Fe, Cu, Cr, Ni and Al). Except for Al, the contents of all elements of interest were below the detection limits on the ppt order. The reactor was operated continuously for several hundred hours and yet there was found nothing abnormal in the waveform of discharge. Thereafter, the discharge space 1 was made open and the interior was examined but nothing abnormal was found, nor was found any stain at all in the area exposed in the discharge space 1. One can anticipate that generally the same results will be obtained with discharge reactors of other constructions, namely those shown in FIGS. 1, 2, 3 and 5.

Example 4

The procedure of Example 3 was repeated except that the positions of the grounded electrode and the high voltage electrode were interchanged. The purity and concentration of the ozone gas generated were substantially the same as in Example 3.

Example 5

Dielectric 2 was made of the firing of a high-purity alumina ceramic material in a thickness of 0.65 mm that was purified to at least 99.7 wt %. Example 1 was repeated except for using the dielectric material. A discharge reactor having the construction shown in FIG. 4 was fabricated and a discharge test was conducted under the same condition as in Example 3 (about 15–20 kW/m$^2$). Since the high-purity alumina ceramic material had a dielectric constant ($\epsilon$) of about 9.5 and a hardness of about 9 on the Mohs scale (almost the same as the single-crystal sapphire), the test results were entirely the same as those obtained in Example 3. One can anticipate that generally the same results will be obtained with discharge reactors of other constructions, namely, those shown in FIGS. 1, 2, 3 and 5.

Example 6

The procedure of Example 5 was repeated except that the positions of the grounded electrode and the high voltage electrode were interchanged. The purity and concentration of the ozone gas generated were substantially the same as in Example 5.

The foregoing description of Examples 1–6 is directed to a discharge reactor of the flat plate type that is common to those shown in FIGS. 1–5 but it should be understood that the discharge reactor of the present invention is in no way limited to this particular case and it may be of a cylindrical type. Furthermore, different electrode geometries, layouts, etc. may be combined as appropriate.

Example 7

Dielectric 2 was made of single-crystal sapphire having a purity of at least 99.999 wt % and a thickness of 0.65 mm. The reason for using the dielectric of ultra-high purity single-crystal sapphire was twofold: first, it was necessary to avoid any adverse effects of the dielectric that may occur during analysis of impurities in the reaction product gas; second, it was necessary to attain an ozone concentration of at least 10 vol %. For practical purposes, high-purity quartz glass, high-purity alumina ceramics and other dielectric materials that are protected against self-contamination will suffice. Using the dielectric 2 described above, discharge reactor of the construction shown in FIG. 4 was fabricated; it was capable of producing high density discharge ozone and concentration.

The grounded electrode 4 which faced the dielectric 2 to generate discharge was formed of either one of the following materials:

(1) pure aluminum of industrial grade (A1050p Japanese Industrial Standard), with Al purity of at least 99.5 wt %; for the compositional table, see Japanese Industrial Standard H4000;

(2) ultra-high purity aluminum, with Al purity of at least 99.998 wt %; for analysis of impurities, see below:
Ag<2 ppm, Ca<1 ppm, Cr<2 ppm, Cu<2 ppm,
Fe<2 ppm, Mg<1 ppm, Mn<1 ppm, Na<0.5 ppm,
Si<3 ppm.

In whichever case, the surface of the grounded electrode 4 was coated with an anodic oxidation film. The anodic oxidation film was formed of hard anodic oxidation coatings; the design requirement for the film thickness was at least 20 µm but the actual thickness was approximately 30–60 µm. The surface hardness of the anodic oxidation film was at least 350–400 on the microrickets hardness (Hv) scale. The film itself was not subjected to compositional analysis; however, in the anodic oxidation step, care was taken to insure that no more than 0.005 wt % of impurities such as heavy metals, alkali metals and alkaline-earth metals would enter the coating and the pore sealing treatment which would cause contamination by impurities or reduction in hardness was not performed. In the discharge reactor under discussion, either material (1) or (2) was used throughout the grounded electrode 4. It should, however, be noted that expensive material (2) (i.e., ultrahigh purity aluminum) may be used only in the discharging area a of the grounded electrode 4 and clad on the substrate b, as shown in FIG. 4. It should also be noted that in order to achieve higher durability, the anodic oxidation coating preferably has a thickness of at least 15 µm and a surface hardness of at least 300 on the microrickets hardness (Hv) scale.

To form the anodic oxidation film, the base material for the grounded electrode which is made of high-purity aluminum material is oxidized to form an oxide film; therefore, unlike in the case where a film of high-purity $Al_2O_3$ or $SiO_2$ is to be formed in a thickness of a few microns on the electrode surface by a sophisticated technique such as CVD, sputtering or ion plating, an anodic oxidation film without substantial impurities with a thickness of at least 20 µm can be readily formed by a simple procedure. The film adheres only weakly to the base material if it is formed by CVD, sputtering or ion plating; on the other hand, the oxide film formed in the embodiment of interest by oxidizing the base material not only adheres very strongly but also has high hardness. In addition, the anodic oxidation treatment itself is a classical and well-established process and, hence, it is more economical than CVD, sputtering and ion plating. A high voltage electrode used was the same as that of Example 1, that is, it was made of metallized Ag film in a thickness of about 10 µm being adhered to on the surface of the dielectric without coming into contact with discharge zone.

Using the apparatus described above, a high-density (about 15–20 kW/m$^2$) ozonizer discharge was generated between the dielectric 2 and the grounded electrode 4 as starting oxygen was supplied into the discharge space 1, whereupon ozone gas was produced in high concentrations of at least 10 vol %. The ozone gas produced was subjected to atomic-absorption spectrometry for elemental analysis, chiefly for alkali metals, alkaline-earth metals (i.e., Na, K and Mg), heavy metals (Fe, Cu, Cr and Ni) and aluminum; those elements could not be detected on the ppb order. However, in view of the test results of Example 3 (using high-pority single-crystal sapphire as a dielectric material), it could safely be assumed that all elements of interest except Al were contained in amounts below the detection limits on the ppt order. In Example 7, the atomic-absorption spectrometry for elemental analysis was conducted on the ppb order in order to check for the occurrence of abnormal reactions. Aluminum analysis was conducted since aluminum was also an element comprising the grounded electrode. Therefore, aluminum which was thought to be generated in the largest amount was subjected to a second analysis on the ppt order and the Al content ranged from several tens of ppt to the limit of detection by atomic absorption spectrometry.

In the next place, the discharge reactor was operated continuously for several hundred hours; thereafter, the reactor was disassembled for checking the surface of the grounded electrode 4 and the inner surface of the discharge space 1 but there was nothing abnormal that could be found and the concentration of ozone generated during the operation of the reactor was very stable at 10 vol %.

Based on these results, one may safely assume that the consumption of electrodes would be reduced markedly by coating the surface of the aluminum electrode with the anodic oxidation film and that this would not only stabilize the performance of the discharge reactor but also reduce the contamination of the product gas. In addition, highly pure aluminum is used as the electrode material and it is coated with an anodic oxidation film that is given maximum protection against entrance of impurities, whereby a high-purity oxide layer with extremely low impurity levels is formed. This would be why the electrodes were consumed in only small amounts during the prolonged operation, and the reaction product was contaminated by less than the detection limit on the ppt order of impurities that would be deleterious to the process of semiconductor fabrication. Furthermore, one may also safely conclude from the test results described above that there would be no problem at all in using as electrode material the pure aluminum of industrial grade which is advantageous on account of easy availability and low cost.

Figure 2:
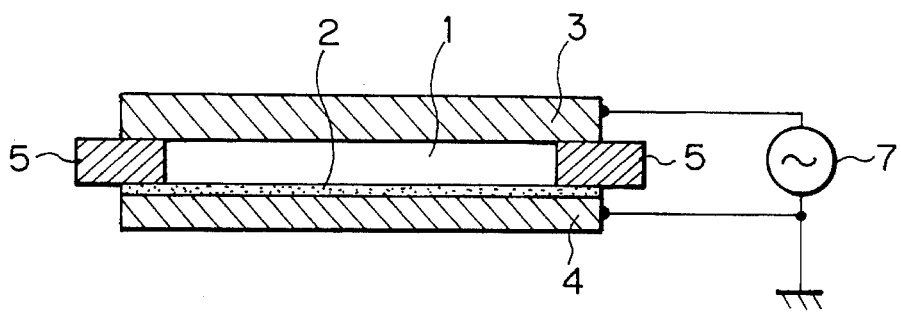
FIG. 2 is a diagram showing schematically the construction of another discharge reactor.
Figure 5:
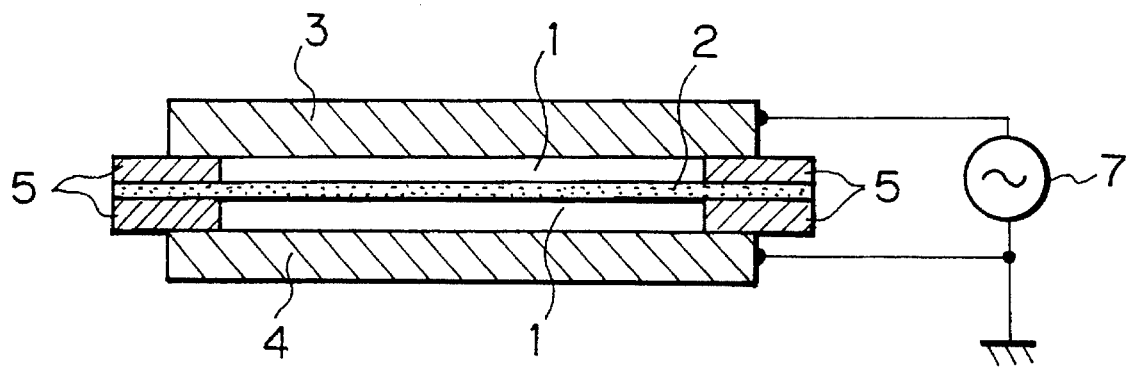
FIG. 5 is a diagram showing schematically the construction of another discharge reactor.

While an embodiment of the present invention has been described above with particular reference being made to a discharge reactor of the construction shown in FIG. 4, it should be anticipated that generally the same results can be attained with the apparatus shown in FIGS. 2, 3 and 5.

Example 8

The procedure of Example 7 was repeated except that the positions of the grounded electrode and the high voltage electrode were interchanged. The purity and concentration of the ozone gas generated were substantially the same as in Example 7.

In addition, the foregoing description of Examples 7 and 8 is directed to a discharge reactor of the flat plate type that is common to those shown in FIGS. 2-5 but it should be noted that the discharge reactor of the present invention is in no way limited to this particular case and that it may be of a cylindrical type. Furthermore, different electrode geometries, layouts, etc. may be combined as appropriate.

As described on the foregoing pages, the discharge reactor of the present invention uses quartz glass ($SiO_2$) purified to 99.99 wt % or more, crystallized oxide, or a high-purity alumina ceramic material as a dielectric, and further, highly purified aluminum as the electrode material in that area of the discharge zone which is to be exposed to discharge and the area of the discharge zone which is to be exposed to discharge is further coated with an anodic oxidation film. Therefore, the discharge reactor of the present invention has the following advantages:

(1) the process of semiconductor fabrication requires an ozone generator that is capable of producing uncontaminated and clean ozone in high concentration and the discharge reactor of the present invention can advantageously be used as such ozonizer;

(2) a product such as highly concentrated ozone gas can be yielded consistently over a prolonged time and, at the same time, the service life of the reactor is extended;

(3) the dielectric can be made directly from the base material and, therefore, the overall process of constructing a discharge reactor can be simplified without involving any step of sophisticated technique such as CVD, sputtering or ion plating; as a result, the final product can eventually be supplied at low cost; and (4) an anodic oxidation film is formed on the electrode base material by its anodic oxidation treatment and, hence, it has high strength of adhesion to the base material, exhibits high hardness and can be formed at low cost.

What is claimed is:

1. A discharge reactor that generates silent discharge and/or creeping discharge between a dielectric and a high voltage electrode and/or a grounded electrode, said dielectric being located between said high voltage electrode and said grounded electrode, and which causes a substance to undergo reaction in the discharge space as it passes through said discharge space or as it is held within said discharge space, said dielectric being formed of crystal sapphire which is highly purified crystallized aluminum oxide, said high voltage electrode and/or grounded electrode in the area of the discharge space which is to be exposed to discharge being composed of a high-purity aluminum material purified to 99.5% by weight or more and at least the area of said electrode(s) which is to be exposed to discharge is further coated with an anodic oxidation film, said anodic oxidation film having a thickness of 15 μm or more and a surface hardness (Hv) of 300 or more on the microvickers scale.

2. A discharge reactor according to claim 1, wherein said dielectric is formed of quartz glass ($SiO_2$) purified to 99.99 wt % or more.

3. A discharge reactor according to claim 1, wherein said dielectric is formed of a high-purity alumina ceramic material that is the firing of aluminum oxide purified to 99.7 wt % or more.

4. A discharge reactor according to claim 2, wherein said high voltage electrode and/or a grounded electrode in the area of the discharge space which is to be exposed to discharge are composed of a high-purity aluminum material purified to 99.5% by weight or more and at least the area of said electrode(s) which is to be exposed to discharge is further coated with an anodic oxidation film, said anodic oxidation film having a thickness of 15 μm or more and a surface hardness (Hv) of 300 or more on the microvickers scale.

5. A discharge reactor according to claim 3, wherein said high voltage electrode and/or a grounded electrode in the area of the discharge space which is to be exposed to discharge are composed of a high-purity aluminum material purified to 99.5% by weight or more and at least the area of said electrode(s) which is to be exposed to discharge is further coated with an anodic oxidation film, said anodic oxidation film having a thickness of 15 μm or more and a surface hardness (Hv) of 300 or more on the microvickers scale.

\* \* \* \* \*